United States Patent [19]

Benzing, II

[11] Patent Number: 5,030,079
[45] Date of Patent: Jul. 9, 1991

[54] ROLLER DIE EXTRUSION AND CALENDERING APPARATUS

[75] Inventor: James A. Benzing, II, North Canton, Ohio

[73] Assignee: The Goodyear Tire & Rubber Company, Akron, Ohio

[21] Appl. No.: 427,814

[22] Filed: Oct. 27, 1989

[51] Int. Cl.⁵ .................................. B29C 47/32
[52] U.S. Cl. .................................. 425/140; 264/37; 264/175; 264/176.1; 425/145; 425/194; 425/308; 425/327; 425/374; 425/381
[58] Field of Search .................. 264/37, 176.1, 175, 264/177.1, 177.16; 425/131.1, 382.3, 381, 466, 194, 374, 376.1, 325, 327, 140, 145, 308

[56] References Cited

U.S. PATENT DOCUMENTS

| | | | |
|---|---|---|---|
| 2,382,177 | 8/1945 | Schanz | 18/11 |
| 2,720,679 | 10/1955 | Ratliff | 264/146 |
| 2,842,796 | 7/1958 | Rhodes | 18/12 |
| 3,142,091 | 7/1964 | Curtiss | 18/12 |
| 3,262,840 | 7/1966 | Hervey | 162/205 |
| 3,274,645 | 9/1966 | Chase | 425/376.1 |
| 3,358,321 | 12/1967 | Seanor et al. | 425/325 |
| 3,427,372 | 2/1969 | Berner | 264/51 |
| 3,871,810 | 3/1975 | Geyer | 425/374 |
| 3,895,898 | 7/1975 | Theysohn | 425/363 |
| 3,956,056 | 5/1976 | Boguslawski et al. | 425/224 |
| 4,299,789 | 11/1981 | Giesbrecht | 264/176 R |
| 4,323,533 | 4/1982 | Bramhall | 264/175 |
| 4,539,169 | 9/1985 | Nixon et al. | 425/131.1 |
| 4,586,984 | 5/1986 | Laapotti | 162/360.1 |
| 4,642,039 | 2/1987 | Anders | 425/382.3 |
| 4,744,745 | 5/1988 | Harada et al. | 425/466 |
| 4,927,482 | 5/1990 | Capelle | 156/500 |
| 4,963,309 | 10/1990 | Gohlisch et al. | 425/382.3 |

*Primary Examiner*—Jeffery Thurlow
*Attorney, Agent, or Firm*—Frederick K. Lacher; T. P. Lewandowski

[57] ABSTRACT

An apparatus and method for forming a strip of elastomeric material which is extruded onto a rotating roller where it is initially shaped by a die plate and then finally shaped by a calender roll positioned downstream from the die plate and in close proximity to the surface of the roller providing a finishing gap for finally shaping the strip of elastomeric material. The calender roll may be positioned on the opposite side of the roller from the position the elastomeric material is extruded onto the roller whereby the calender roll resists forces tending to bend the roller. The extruder screw may have a downstream end adjacent the roller for reducing the pressure and for self-cleaning the apparatus.

16 Claims, 5 Drawing Sheets

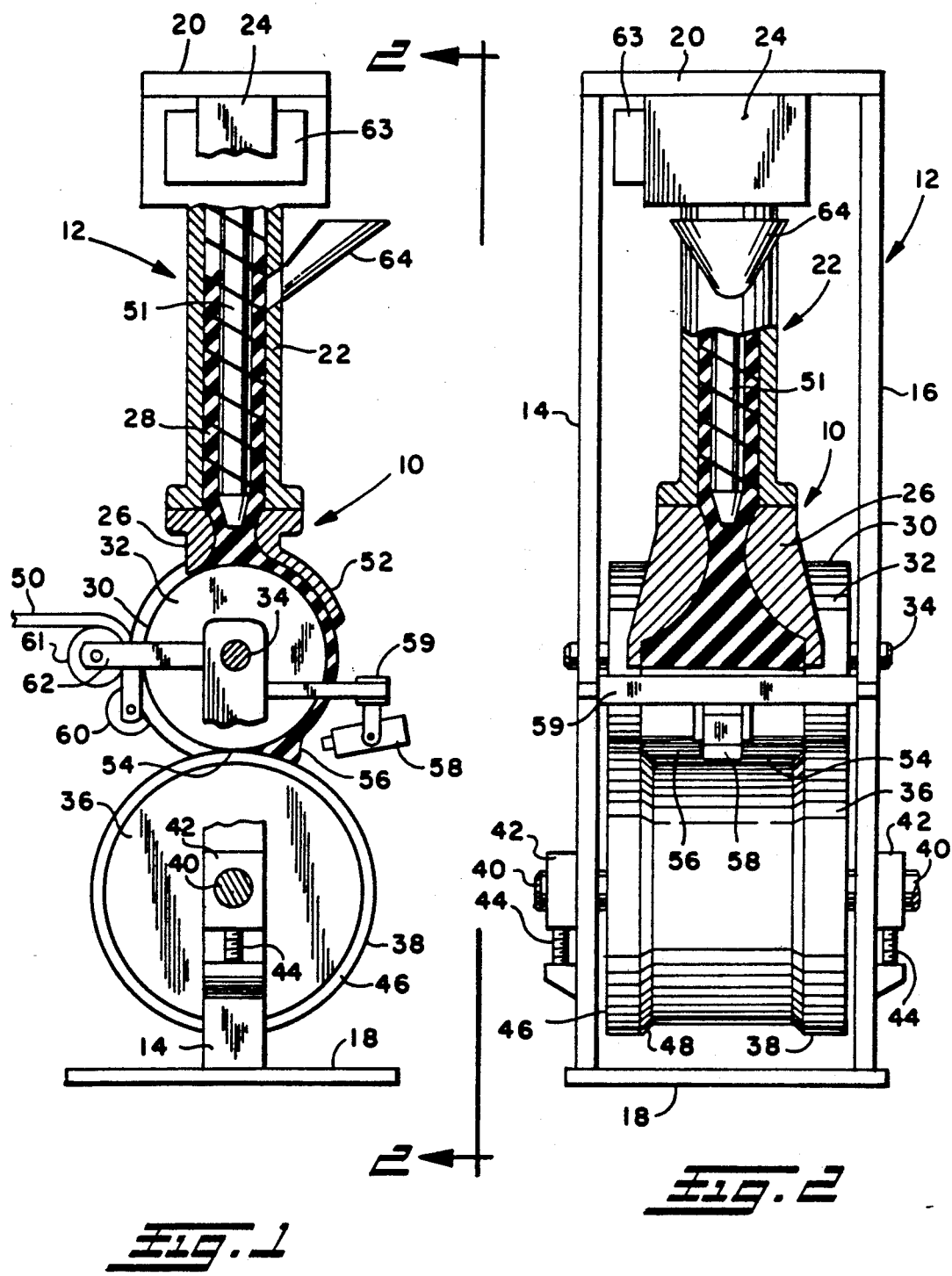

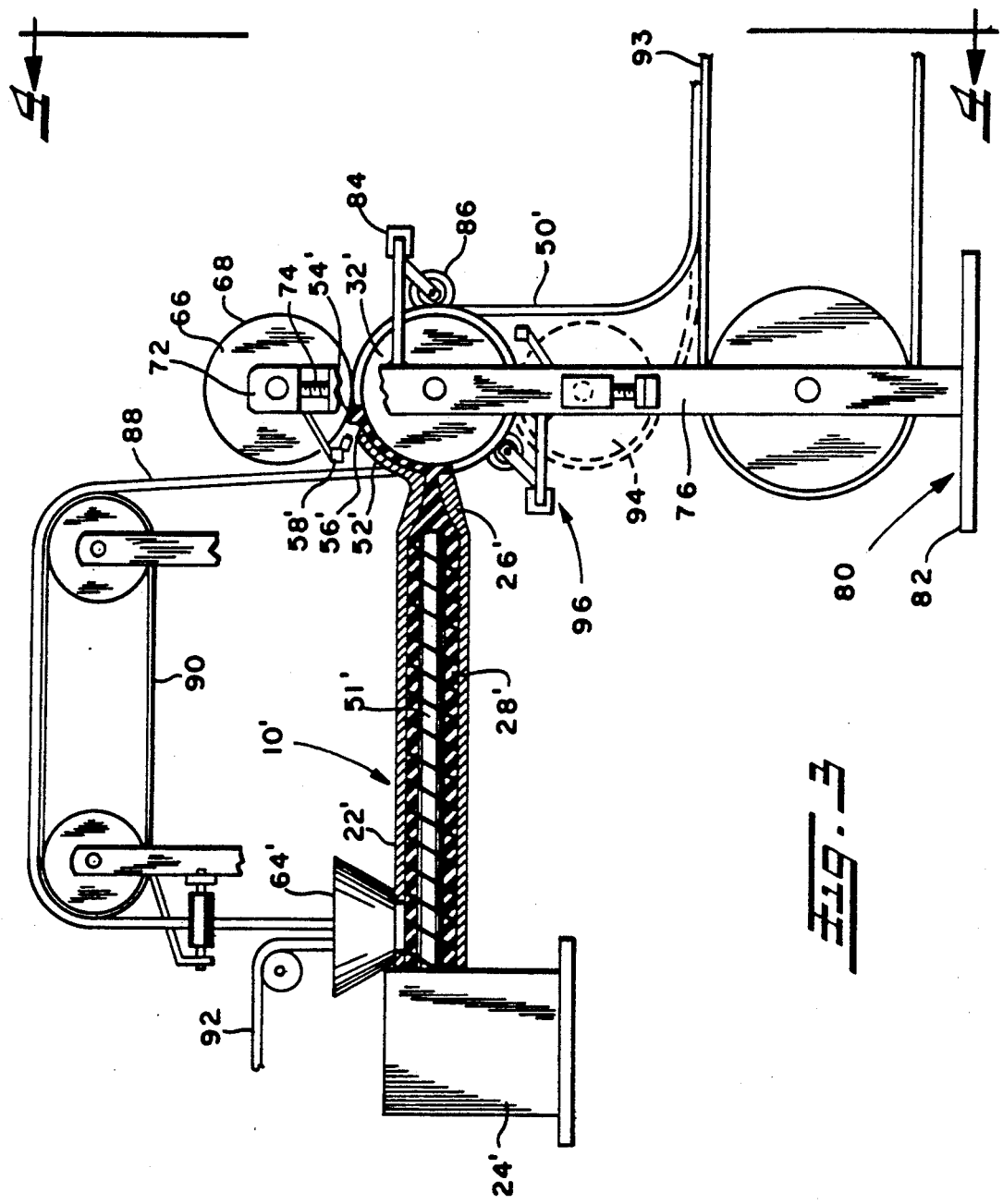

ROLLER DIE EXTRUSION AND CALENDERING APPARATUS

This invention relates generally to the forming of a strip of elastomeric material by initially shaping the strip on a roller die extrusion apparatus and then calendering the strip to provide the final shaping. This is important in precision forming of tire components such as inner liners, gum strips, wedges, apexes, and single compound black sidewalls.

BACKGROUND OF THE INVENTION

Heretofore strips of elastomeric material have been initially formed on the roller die apparatus and then conveyed to a calender where the strip is finally formed between two calender rolls. This procedure required a separate calender line with a separate drive and personnel for manning the calender line. Where the final shaping has been provided by the roller die apparatus, high pressures in the extruder nozzle and in the die plate have been required which have caused deflection of the roller and made it difficult to maintain the uniformity of the component produced by the roller die apparatus. It has been proposed to combine two roller die assemblies to laminate strips extruded onto adjacent rollers by opposed extruders. This required adjustment of one of the roller die assemblies to control the nip size between the rollers. Backup rolls have also been used for minimizing the bending of pressing rollers; however, this has not been done with a roller for a roller die apparatus where the roller surface is used to partially form the extruded strip.

SUMMARY OF THE INVENTION

The present invention is directed to a method and apparatus in which a strip of elastomeric material is initially formed by extruding the strip onto a rotating roller where it is initially shaped by a die plate spaced from the surface of the roller. A calender roll is positioned downstream of the die plate and has a calender surface in close proximity to the surface of the roller providing a finishing gap for finally shaping the strip of elastomeric material. The calender roll may be positioned on the opposite side of the roller from the extruder to resist forces tending to bend the roller. Edge cutters may be provided downstream of the calender roll and the selvage reused. By measuring the size of the bank between the roller and the calender roll in the finishing gap, the rate of extrusion can be controlled to further improve the weight uniformity of the strip and provide contour uniformity of the extruded component. With this apparatus a small bank can be maintained which is important in producing uniform components with precise dimensions.

In accordance with one aspect of the invention there is provided a roller die extrusion apparatus for forming a strip of elastomeric material comprising a roller with an axis circumvented by a roller surface, means for rotating the roller about the axis, an extruder for mixing and plasticizing the elastomeric material under pressure, a nozzle portion at an outlet end of the extruder for extruding the elastomeric material under pressure onto the roller surface, a die plate connected to the extruder at the nozzle portion and extending along the roller surface downstream of the nozzle portion for initially shaping the elastomeric strip, a calender roll positioned downstream of the die plate, the calender roll having a calender surface in close proximity to the roller surface providing a finishing gap for finally shaping the strip of elastomeric material.

In accordance with another aspect of the invention there is provided a method of forming a strip of elastomeric material comprising:

(a) extruding a strip of elastomeric material from an extruder onto a rotating roller surface;

(b) guiding and initially shaping the strip as the strip is moved past a die plate spaced from the roller surface; and (c) finally shaping the strip between a calender roll and the roller at a position on the roller downstream from the die plate where a finishing gap is provided between the roller and the calender roll.

To acquaint persons skilled in the arts most closely related to the present invention, certain preferred embodiments thereof illustrating best modes now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

BRIEF DESCRIPTION OF THE DRAWINGS

FIG. 1 is a schematic elevation partially in section and with parts broken away showing one embodiment of the invention with a strip component being initially shaped by the roller die apparatus and finally shaped between the roller and a calender roll positioned opposite the extruder.

FIG. 2 is a view taken along line 2—2 in FIG. 1 with parts sectioned and broken away to show the flow of elastomeric material through the extruder nozzle portion and die plate to initially shape a strip on the roller and finally shape the strip at the finishing gap between the calender roll and the roller.

FIG. 3 is a schematic side elevation of a second embodiment of the invention with parts sectioned to show the flow of elastomeric material between the roller and a calender roll. The position of a second calender roll is shown in dotted lines. Conveyors are also shown for carrying the finished strip away and for conveying the trim selvage back into the extruder.

DESCRIPTION OF THE PREFERRED EMBODIMENTS

Figure 4:
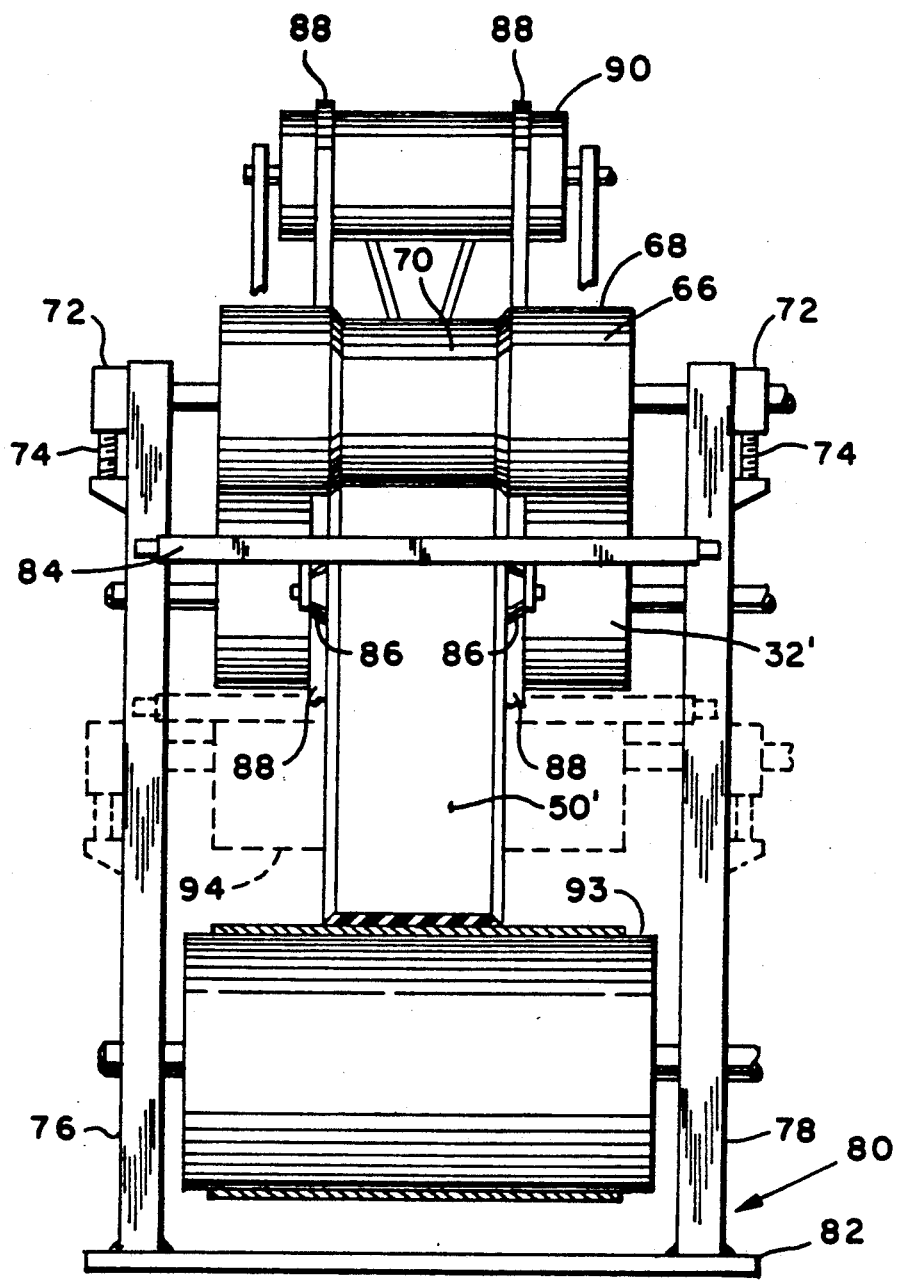
FIG. 4 is a schematic view taken along line 4—4 in FIG. 3 showing the cutters and the cutting bar.
Figure 5:
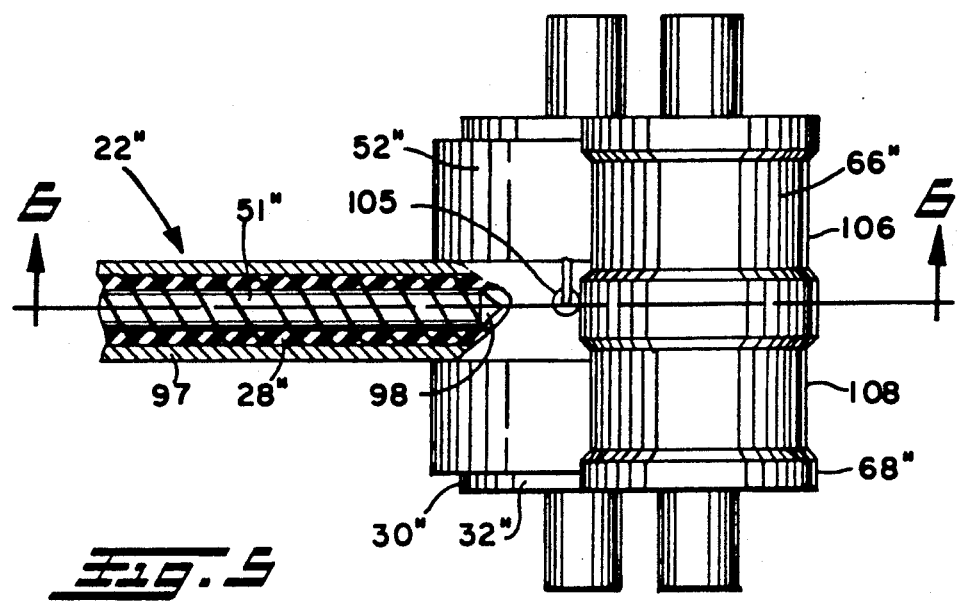
FIG. 5 is a schematic plan view of a third modification of the invention with parts broken away showing an extruder and die plate wherein the screw feeds the material directly into a passageway between a roller and die plate.

Referring to FIGS. 1 and 2, a roller die extrusion apparatus 10 is shown mounted on a frame 12 having side members 14 and 16, a base 18 and a top member 20. An extruder 22 has a drive 24 supported on the top member 20 and a nozzle portion 26 for extruding an elastomeric material such as rubber 28 on a roller surface 30 of a roller 32. A shaft 34 supporting the roller 32 is mounted in bearings supported by the side members 14 and 16 and connected to a source of power such as a motor (not shown).

A calender roll 36 is positioned below the roller 32 with a calender roll surface 38 in close proximity to the roller surface 30. The calender roll 36 has a shaft 40 mounted in bearings 42 adjustable vertically by suitable adjusting means such as screws 44 mounted on the side members 14 and 16. The calender roll 36 may have a sleeve 46 removably fastened to the calender roll with a recess 48 of a predetermined configuration extending circumferentially of the calender roll for finally shaping a strip 50 of elastomeric material.

The rubber 28 in the extruder 22 is masticated and the temperature increased by rotation of a feed screw 51. During extrusion of the rubber 28 against the roller surface 30, the roller 32 is rotated in a clockwise direction, as shown in FIG. 1, carrying the rubber downstream of the nozzle portion 26 through the space between a guide member such as die plate 52 and the roller surface 30 where the strip 50 is initially shaped. The strip 50 is then carried to the nip or finishing gap 54 where a small bank 56 of rubber 28 is formed. In this finishing pass between the roller 32 and the calender roll 36, the density is increased and a more uniform contour of the strip 50 is attained.

Measuring means such as a laser gauge 58 may be mounted on a rod 59 fastened to the side members 14 and 16 for measuring the size of the bank 56. The laser gauge 58 may be connected to extruder controls 62 whereby the speed of rotation of the screw 51 may be increased or decreased in response to the measurement of the size of the bank 56 in order that the bank size will be maintained at the most desirable magnitude. After passage of the strip 50 through the finishing gap 54, the strip may be trimmed by cutters 60 and the strip carried by to a suitable storage container. The cutters 60 and roller 61 may be supported on brackets 62 fastened to the side members 14 and 16. The temperature of the roller 32 is lower than the temperature of the calendar roll 36. In this embodiment the temperature of the roller 32 is about 180° F. (82.22° C.) and the temperature of the calender roll 36 is about 240° F. (115.56° C.). As a result the strip 50 tends to stick to the cooler roller 32.

During operation, the calender roll 36 may be rotated by suitable means such as a motor (not shown) attached to the shaft 40 so that the peripheral speed of the roller surface 30 is equal to the peripheral speed of the calender roll surface 38.

If desired, the bearings 42 supporting the shaft 40 of the calender roll 36 may be raised or lowered by rotating the screws 44. The calender roll 36 may be removed by retracting the screws 44 from the bearings 42 and the shaft 40 removed from the side members 14 and 16. The sleeve 46 may then be replaced with another sleeve having a different shaped recess 48 so that the finished strip 50 may have a different size or shape. Likewise, the die plate 52 may be removed and replaced with another die plate to provide different initial shaping of the strip 50.

In operation, the rubber 28 is fed through a feed hopper 64 of the extruder 22. Also the trim selvage, which sticks to the roller 32, may be conveyed on the roller and fed into the nozzle portion 26 by the rotation of the roller.

The deflection from bending of the roller 32 due to the pressure of the rubber 28 extruded against the surface 30 of the roller may be counteracted by supporting the roller with the calender roll 36 which is positioned opposite the extruder 22. Preferably, the calender roll 36 has a larger diameter than the diameter of the roller 32 to further increase the rigidity of the calender roll. The width of the calender roll 36 is also kept to a minimum to increase the rigidity.

The rubber 28 in strip or pellet form is fed into the feed hopper 64 and the screw 51 rotated to masticate and increase the temperature of the rubber. If desired, the extruder walls may be heated to further increase the temperature of the rubber 28. The rubber 28 is extruded through the nozzle portion 26 onto the rotating roller 32 so that the strip 50 is carried past the die plate 52 where there is initial shaping of the strip. When the strip 50 reaches the finishing gap 54, the bank 56 is built up while the strip is urged through the finishing gap and finally shaped in the recess 48 in the calender roll surface 38. While the strip 50 is being shaped, the laser gauge 58 measures the size of the bank 56 and the rotating speed of the screw 51 is increased or decreased to provide the final desired size of the bank 56 for shaping of the strip.

Referring to FIGS. 3 and 4, a modification of the invention is shown in which a different configuration of the parts is utilized. Where parts for this modification are identical to parts described and shown for the embodiment of FIGS. 1 and 2, the parts will be identified with the same number but with a prime mark added. Referring to FIG. 3, a roller die extrusion apparatus 10' includes an extruder 22' with a drive 24' having a feed screw 51' and a feed hopper 64'. Rubber 28' is masticated and the temperature increased by rotation of the screw 51' in the extruder 22' urging the rubber through a nozzle portion 26' against a rotating roller 32'. The strip 50' is initially formed by a die plate 52' and then finally formed in a finishing gap 54' between a calender roll 66 and the roller 32'. A laser gauge 58' measures the size of a bank 56' so the finishing gap 54' and the rotating speed of the screw 51' is increased or decreased to provide the desired size of the bank. The calender roll 66 has a calender roll surface 68 which may have a recess 70 extending circumferentially of the roll providing the desired contour of the strip 50'. The calender roll 66 is mounted in bearings 72 which may be adjustable vertically on mounting means such as screws 74 supported on side members 76 and 78 of a frame 80 having a base 82.

Downstream of the finishing gap 54' is a cutting knife assembly bar 84 removably mounted on the side members 76 and 78 and carrying cutters 86 set to trim the edges of the strip 50' after it is finally shaped. Trim selvage 88 is carried around the roller 32' and then over a conveyor system 90 to a position over the feed hopper 64' where it is returned to supplement the feeding of a supply strip 92 of rubber 28' from another source of rubber supply (not shown). The finished strip 50' may then be carried by a suitable conveyor 93 to a storage position (not shown).

As shown in dotted lines, a second calender roll 94 may be mounted on the side members 76 and 78 with a second cutting knife assembly bar 96 so that when the first calender roll 66 is being replaced as by adding a new sleeve, the second calender roll may be used to produce the strip material.

The roller 32' has a temperature lower than the temperature of the calender rolls 66 and 94 so that the trim selvage 88 will stick to the roller until it is pulled off and carried over the conveyor system 90.

Referring to FIGS. 5, 6 and 7 through 10, another modification is shown which is generally of the same configuration as the embodiment of FIGS. 3 and 4 except for the die plate, nozzle portion and extruder screw. Where parts of this modification are identical to parts described and shown for the embodiment of FIGS. 3 and 4, the parts will be identified with the same number but with a double prime mark added.

An extruder 22" has a cylinder 97 in which a screw 51" is rotatably mounted for mixing and plasticizing an elastomeric material such as rubber 28". The screw 51" extends through nozzle portion 26" to a position where a downstream end 98 of the screw is located adjacent the roller surface 30" of the roller 32". The screw 51" has a screw tip 100 having a curved contour 101 with substantially the same radius R as the radius of the roller 32".

Figure 6:
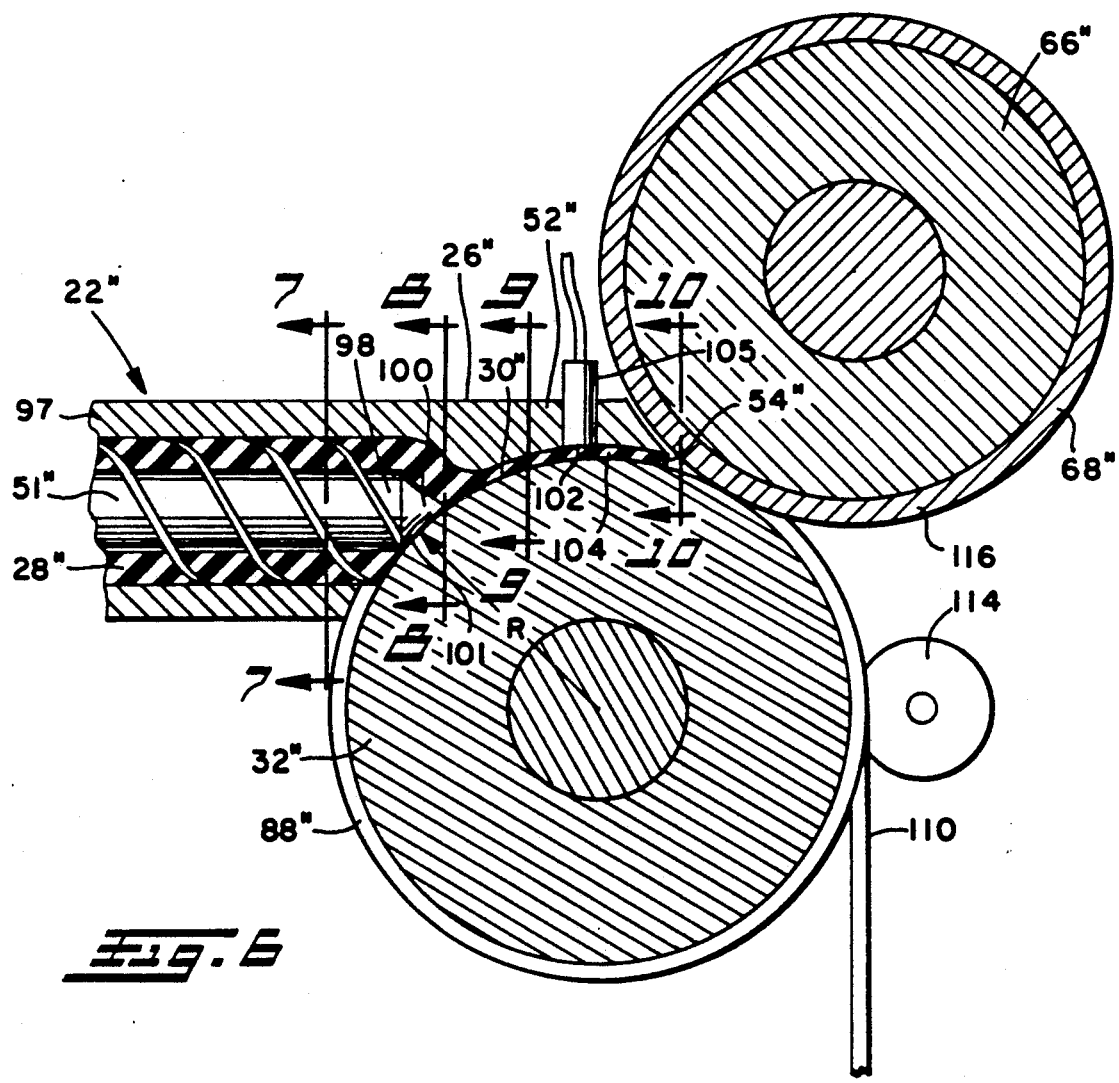
FIG. 6 is a schematic view in section taken along line 6—6 in FIG. 5.
Figure 8:
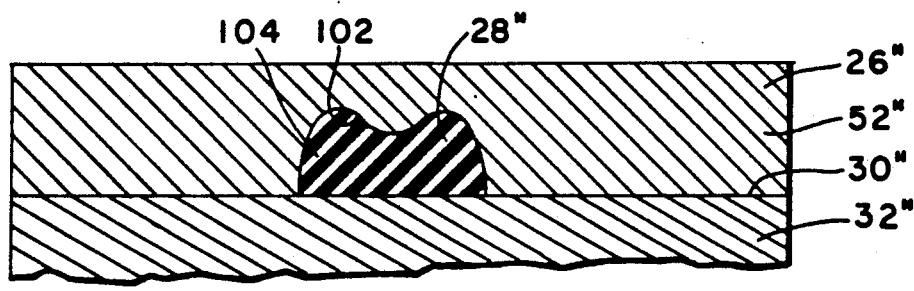
FIG. 8 is a section taken along line 8—8 in FIG. 6.
Figure 9:
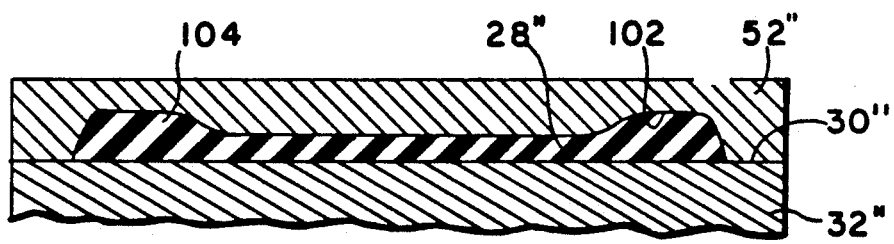
FIG. 9 is a section taken along line 9—9 in FIG. 6.
Figure 10:
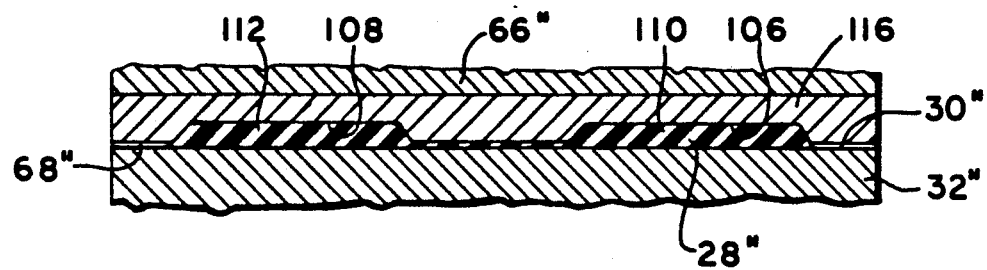
FIG. 10 is a section taken along line 10—10 in FIG. 6.

A die plate 52" is mounted on the end of the extruder 22" and overlaps the roller surface 30". As shown in FIGS. 6, 8 and 9, the nozzle portion 26" and the die plate 52" have a groove 102 through which the rubber 28" is pulled into a finishing gap 54" between the roller 32" and a calender roll 66". The groove 102 is shaped to provide a passageway 104 between the roller surface 30" and the surface of the groove. A pressure transducer 105 may be positioned on the die plate 52" to measure the pressure in the die plate passageway 104 and thereby control the bank at the finishing gap 54" by adjusting the speed of rotation of the screw 51". The calender roll surface 68" may have recesses 106 and 108 providing shaping of elastomeric components such as treads 110 and 112.

Figure 7:
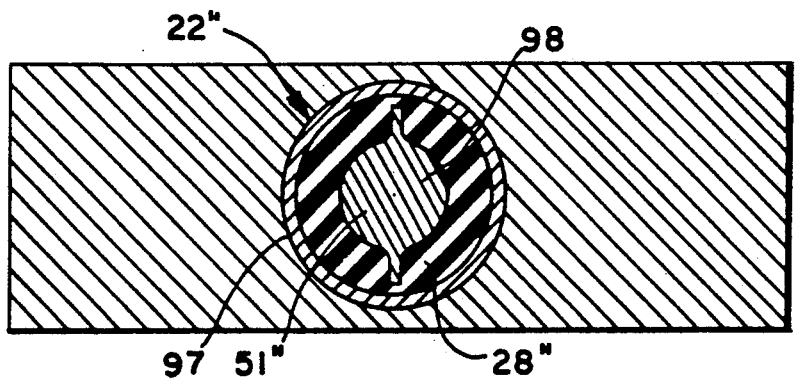
FIG. 7 is a section taken along line 7—7 in FIG. 6.

As shown in FIGS. 6 and 7, the downstream end 98 of the screw 51" has a diameter substantially the same as the diameter of the cylinder 97 of the extruder 22" so that the pressure at which the rubber 28" is fed to the passageways 104 and 106 is kept to a minimum. By maintaining a relatively low pressure of the rubber 28" in the extruder 22", nozzle portion 26" and die plate 52", the temperature of the rubber can be minimized. This lower temperature of the rubber 28" makes possible operation of the extruder 22" and calender at higher speeds providing higher output. With this construction the same source of power such as a motor may drive both the roller 32" and the calender roll 66".

In operation the rubber 28" is mixed and plasticized by the feed screw 51" and fed through the nozzle portion 26" directly onto the roller surface 30" and through the passageway 104 in the die plate 52". The roller 32" is rotated to pull the rubber 28" into the finishing gap 54" where the tread components 110 and 112 are finally shaped. The temperature of the roller 32" is lower than the temperature of the calender roll 66" so that the tread components 110 and 112 will stick to the roller after leaving the finishing gap 54". A suitable trimming device such as cutter wheels 114 are positioned adjacent the roller 32" for trimming the selvage 88" off the tread components 110 and 112. Thereafter the tread components 110 and 112 are carried by a conveyor or other suitable means to a place of storage (not shown). If desired, the calender roll 66" may have a sleeve 116 containing the recesses 106 and 108. The sleeve 116 may be replaced by other sleeves having different surface configurations at the calender roll surface 68" so that it is not necessary to replace the calender roll 66" in order for the different components to be run.

When the operation is concluded the screw 51" conveys the remaining rubber 28" to the roller surface 30" which in turn carries the remaining rubber to the calender roll 66" where it is pulled through the gap 54". In this way this embodiment of the invention is self-cleaning and it is not necessary to dismantle the extruder 22" to clean the rubber 28" from the nozzle portion 26".

While certain representative embodiments and details have been shown for the purpose of illustrating the invention, it will be apparent to those skilled in the art that various changes and modifications may be made therein without departing from the spirit or scope of the invention.

What is claimed is:

1. A roller die extrusion apparatus for forming a strip of elastomeric material comprising a roller with an axis circumvented by a roller surface, means for rotating said roller about said axis, an extruder for mixing and plasticizing said elastomeric material under pressure, a nozzle portion at an outlet end of said extruder for extruding said elastomeric material under pressure onto said roller surface, a die plate connected to said extruder at said nozzle portion and extending along said roller surface downstream of said nozzle portion, said die plate having a surface with a groove defining a passageway with said roller surface for initially shaping said elastomeric strip, a calender roll positioned downstream of said die plate, said calendar roll having a calendar surface with a circumferentially extending recess in close proximity to said roller surface providing a finishing gap for finally shaping said strip of elastomeric material.

2. Apparatus in accordance with claim 1 wherein said calender roll is positioned on an opposite side of said roller from said extruder for counteracting the pressure of said elastomeric material extruded against said roller surface at said nozzle portion.

3. Apparatus in accordance with claim 2 wherein said calender roll is of greater diameter than the diameter of said roller providing rigidity of said calender roll for counteracting the pressure of said elastomeric material against said roller surface at said nozzle portion.

4. Apparatus in accordance with claim 1 including measuring means at said finishing gap for measuring the size of a bank in said finishing gap and extruder control means responsive to said measuring means for increasing or decreasing the extrusion of said elastomeric material onto said roller surface.

5. Apparatus in accordance with claim 1 including edge trimming means positioned downstream of said calender roll for separating trim selvage from the edges of said strip and conveyor means for carrying said trim selvage to said extruder.

6. Apparatus in accordance with claim 1 wherein a second calender roll is positioned downstream from said first-mentioned calender roll including means for moving said first-mentioned calender roll and said second calender roll into and out of engagement with said roller to change the final shaping of said strip of elastomeric material.

7. A roller die extrusion apparatus for forming a strip of elastomeric material comprising a roller with an axis circumvented by a roller surface, means for rotating said roller about said axis, an extruder for mixing and plasticizing said elastomeric material under pressure, a nozzle portion at an outlet end of said extruder for extruding said elastomeric material under pressure onto said roller surface, a die plate connected to said extruder at said nozzle portion and extending along said roller surface downstream of said nozzle portion, said die plate having a surface with a groove defining a passageway with said roller surface for initially shaping said elastomeric strip, a calender roll positioned downstream of said die plate, said calender roll including a sleeve mounted on said roll and having a calender surface in close proximity to said roller surface providing a finishing gap for finally shaping said strip of elastomeric material.

8. Apparatus in accordance with claim 7 wherein said sleeve may be removed and replaced with a second sleeve having a different calender surface for providing a different finishing shape to said elastomeric strip.

9. A roller die extrusion apparatus for forming a strip of elastomeric material comprising a roller with an axis circumvented by a roller surface, means for rotating said roller about said axis, an extruder for mixing and plasticizing said elastomeric material under pressure, a nozzle portion at an outlet end of said extruder for extruding said elastomeric material under pressure onto said roller surface, a die plate connected to said extruder at said nozzle portion and extending along said roller surface downstream of said nozzle portion for initially shaping said elastomeric strip, said extruder having a cylinder, a screw rotatable in said cylinder for mixing and plasticizing said elastomeric material, said screw having a downstream end at said outlet extending through said nozzle portion to a position adjacent said roller for feeding said elastomeric material directly onto said roller surface and providing self-cleaning of said apparatus and a calender roll positioned downstream of said die plate, said calender roll having a calender surface in close proximity to said roller surface providing a finishing gap for finally shaping said strip of elastomeric material.

10. Apparatus in accordance with claim 9 wherein said downstream end of said screw has a screw tip with a surface configuration having a radius substantially the same as the radius of said roller.

11. Apparatus in accordance with claim 10 wherein said nozzle portion has a diameter substantially the same as said cylinder of said extruder.

12. Apparatus in accordance with claim 9 wherein said screw is positioned for feeding said elastomeric material directly into said passageway and over said roller by said screw.

13. A roller die extrusion apparatus for forming a strip of elastomeric material comprising a roller with an axis circumvented by a roller surface, means for rotating said roller about said axis, an extruder for mixing and plasticizing said elastomeric material under pressure, said extruder having a cylinder, a screw rotatable in said cylinder for mixing and plasticizing said elastomeric material, a nozzle portion at an outlet end of said extruder for extruding said elastomeric material under pressure onto said roller surface, a die plate connected to said extruder at said nozzle portion and extending along said roller surface downstream of said nozzle portion, said die plate having a surface with a groove defining a passageway with said roller surface for initially shaping said elastomeric strip, and said screw having a downstream end at said outlet extending through said nozzle portion to a position adjacent said roller for feeding said elastomeric material directly onto said roller surface and providing self-cleaning of said apparatus.

14. Apparatus in accordance with claim 13 wherein said downstream end of said screw has a screw tip with a surface configuration having a radius substantially the same as the radius of said roller.

15. Apparatus in accordance with claim 14 wherein said nozzle portion has a diameter substantially the same as the diameter of said cylinder of said extruder.

16. Apparatus in accordance with claim 13 wherein said die plate has a surface with a groove defining a passageway with said roller surface for feeding said elastomeric material directly into said passageway and over said roller by said screw.

* * * * *